United States Patent [19]
Naimpally

[11] Patent Number: 5,278,637
[45] Date of Patent: Jan. 11, 1994

[54] APPARATUS AND A METHOD FOR QUADRATURE-PHASE ENCODING AND TRANSMITTING A DIGITAL SIGNAL IN A VIDEO SIGNAL

[75] Inventor: Saiprasad V. Naimpally, Langhorne, Pa.

[73] Assignee: Matsushita Electric Corporation of America, Secaucus, N.J.

[21] Appl. No.: 951,163

[22] Filed: Sep. 25, 1992

[51] Int. Cl.$^5$ .................. H04N 11/00; H04N 7/00
[52] U.S. Cl. ............................ 358/12; 358/36; 358/16
[58] Field of Search ............ 358/12, 11, 142, 141, 358/36, 167, 16; 375/60; H04N 11/00, 7/00, 7/04

[56] References Cited

U.S. PATENT DOCUMENTS

| | | | |
|---|---|---|---|
| 4,816,899 | 3/1989 | Strolle et al. | 358/12 |
| 4,864,403 | 9/1989 | Chao et al. | 358/167 |
| 5,053,858 | 10/1991 | Koslov et al. | 358/12 |
| 5,122,868 | 6/1992 | Isnardi | 358/36 |
| 5,128,747 | 7/1992 | Isnardi et al. | 358/12 |

OTHER PUBLICATIONS

T. Fukinuki & Y. Hirano, "Extended Definition TV Fully Compatible with Existing Standards," IEEE Trans. on Communications, COM-32, No. 8, pp. 948-953 (Aug. 1984).
M. A. Isnardi, "Multidimensional Interpretation of NTSC Encoding and Decoding," IEEE Trans. on Consumer Electronics, vol. 34, No. 1, pp. 179-193 (Feb. 1988).
M. Schwartz, "Information Transmission, Modulation, and Noise," McGraw-Hill, Inc., pp. 226-235 (1980).

*Primary Examiner*—James J. Groody
*Assistant Examiner*—Safet Metjahic
*Attorney, Agent, or Firm*—Ratner & Prestia

[57] ABSTRACT

A system for encoding digital data into a video signal first encodes the digital data into in-phase and quadrature-phase component signals, using a 16 quadrature amplitude modulation (16 QAM) technique. The in-phase and quadrature-phase signals are then used to modulate respective quadrature phase related Fukinuki carrier signals. These modulated carrier signals are combined with the video signal after the video signal has been modified to ensure that all information in the band of frequencies occupied by the modulated Fukinuki carrier signals is identical between the two fields of each frame. The result is a composite video signal in which the digital data is imperceptibly encoded. This signal is decoded by separating the band of frequencies occupied by the Fukinuki modulated data from other frequencies in the video signal and subtracting the second field of each frame from the first field and then demodulating the result using a 16 QAM demodulator.

12 Claims, 6 Drawing Sheets

APPARATUS AND A METHOD FOR QUADRATURE-PHASE ENCODING AND TRANSMITTING A DIGITAL SIGNAL IN A VIDEO SIGNAL

BACKGROUND OF THE INVENTION

The present invention relates to apparatus and a method for imperceptibly sending digital information during the active portion of an interlaced video signal and in particular to a method of sending such digital information by modulating a Fukinuki carrier with the digital data using quadrature amplitude modulation (QAM) techniques.

Currently there are several systems which send limited amounts of digital information in a television signal. These include teletext, in which information in a magazine format is sent with a television signal, and closed captioning for the deaf, in which subtitles for television programs are transmitted as a part of the television signal. One method of transmitting this information is to place standard encoded digital data into the television signal during the vertical blanking interval of each field. Another method transmits the digital data by modulating a separate carrier in the audio portion of the television signal. Using these methods, a limited amount of digital information may be transmitted with the television signal in a manner which does not affect the quality of the image or its accompanying sound as perceived by a viewer.

Many other methods are known for transmitting digital information through an analog channel. For example, frequency shift key (FSK), phase shift key (PSK) and quadrature amplitude modulation (QAM). All of these methods are described in a textbook by M. Schwartz entitled Information Transmission, Modulation and Noise, McGraw Hill, 1990. None of these methods can be used in their conventional sense to transmit digital information in the active (i.e. image conveying) portion of a television signal, however, since they would perceptibly interfere with at least some portion of the reproduced image.

SUMMARY OF THE INVENTION

The present invention is embodied in a system which conveys digital data in a field interlaced television signal through quadrature amplitude modulation (QAM) of a Fukinuki carrier. The system includes circuitry which processes the existing video information in both fields of each frame in the band of frequencies occupied by the modulated Fukinuki carrier to ensure that it is identical.

The system also includes circuitry which translates the digital values into separate in-phase (I) and quadrature (Q) signals containing substantially identical information for both fields of each frame, and circuitry which modulates two quadrature phase related Fukinuki carriers with the filtered I and Q signals. The output signal of the modulator is additively combined with the modified video signal to generate a composite video signal that includes the digital information.

This process is reversed at the receiver in order to recover the digital information.

DETAILED DESCRIPTION OF THE INVENTION

Figure 1:
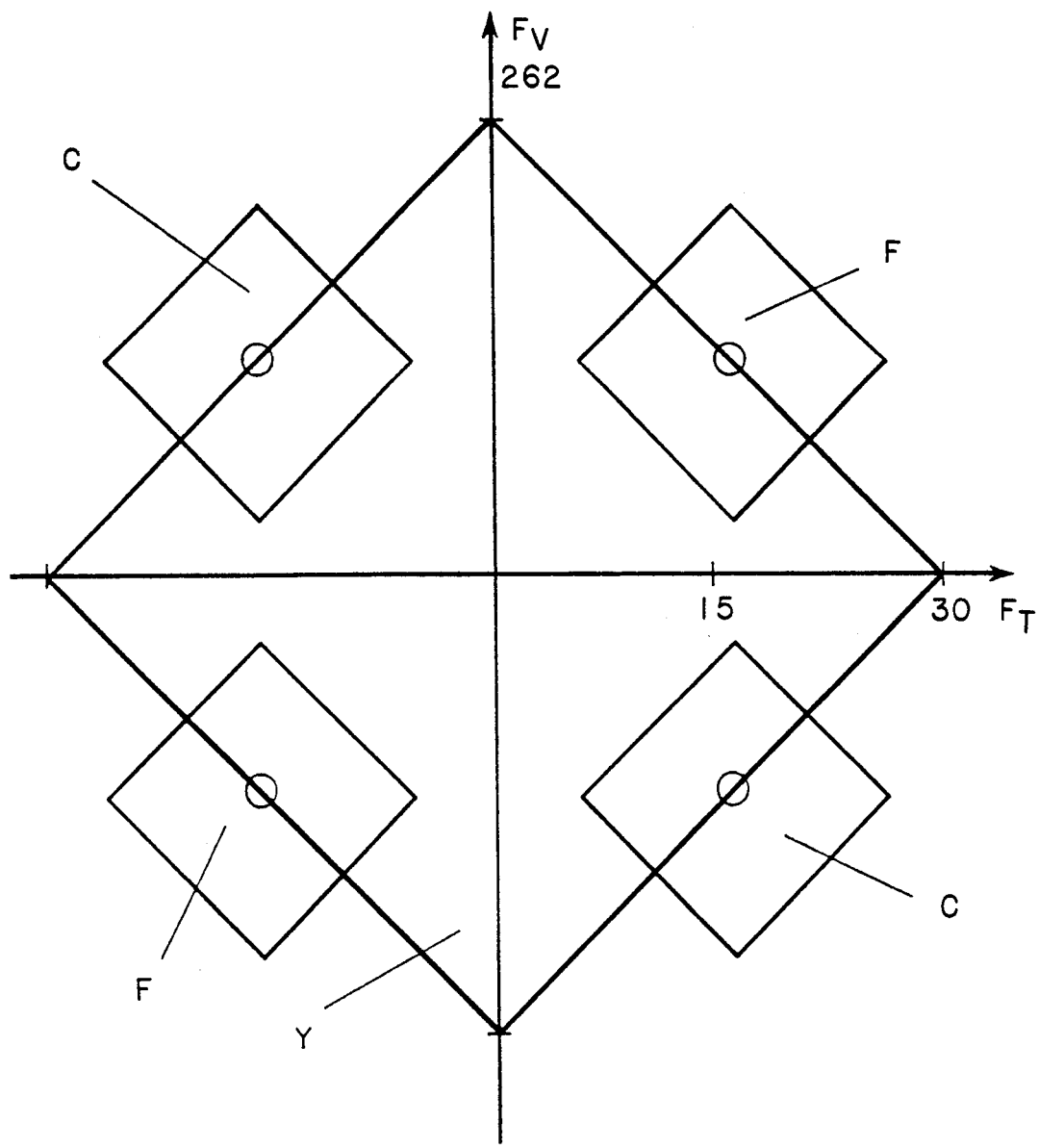
FIG. 1 (prior art) is a graph of vertical resolution versus temporal resolution which is useful for describing the relationship between the chrominance signal components of a composite video signal and the Fukinuki components.

In the drawings, line arrows may represent busses carrying multiple-bit digital signals or connections conveying analog signals or single-bit digital signals. Depending on the processing speed of the devices, compensating delays may be required in certain of the signal paths. One skilled in the art of digital signal processing circuit design will know where such delays are needed in a particular system.

The transmission of auxiliary information in a television signal using a Fukinuki carrier is described in a paper by T. Fukinuki et al. entitled "Extended Definition TV Fully Compatible With Existing Standards", *IEEE Transactions on Communications*, Vol. COM-32, No. 8, August 1984, pp. 948-953, which is hereby incorporated by reference for its teachings on Fukinuki-type modulation. This paper describes an area in the spatio-temporal frequency spectrum of an interlaced color television signal which contains only a relatively small amount of information that can be perceived by the human eye. This region is commonly called the Fukinuki hole.

FIG. 1 is a graph of vertical resolution versus temporal resolution which is useful for describing the Fukinuki hole. As shown in this diagram the highest vertical resolution, 262 cycles per picture height (cph), occurs when a still object is displayed. When an object is in motion the greatest temporal resolution that can be observed without aliasing is 30 Hz. At this resolution, however, the vertical resolution of the image is at a minimum.

The areas of the diagram labeled C represent the portion of the spatio-temporal spectrum of an NTSC interlaced video signal which is occupied by the chrominance component. The regions labeled F are corresponding regions which are used for Fukinuki type modulation.

As shown in this Figure, Fukinuki type modulation is closely related to the conventional quadrature modulation techniques used to add the color information signals to the interlaced video signal As is well known, the chrominance or color information component of the video signals is developed by modulating two quadrature phase related subcarrier signals by respective color difference signals (e.g. I and Q) having a chrominance phase relationship of 90°. Each of the chrominance subcarrier signals changes phase by 180° from line to line and from frame to frame. The color subcarrier signals for lines within a frame that are separated by one field interval (i.e. 262 H), however, are in phase with each other.

Fukinuki modulation differs from the standard NTSC chrominance modulation by requiring the subcarrier signals to be 180° out of phase from field to field as well as from frame to frame and line to line.

In order to effectively separate the Fukinuki modulated information from the composite video signal, it is desirable for the information on both fields of a given frame to be identical. This is true both for the Fukinuki modulated information and for the chrominance and high-frequency luminance information which occupies the same band of frequencies.

An NTSC video signal image frame is made up of 525 horizontal line intervals. Thus, each field has 262.5 line intervals. Two types of field delays are commonly used in NTSC video signal processing apparatus: a 262 H delay and a 263 H delay. Composite video signals which are delayed by 262 H have the same chrominance subcarrier phase while signals delayed by 263 H have opposite chrominance subcarrier phases.

Figure 2:
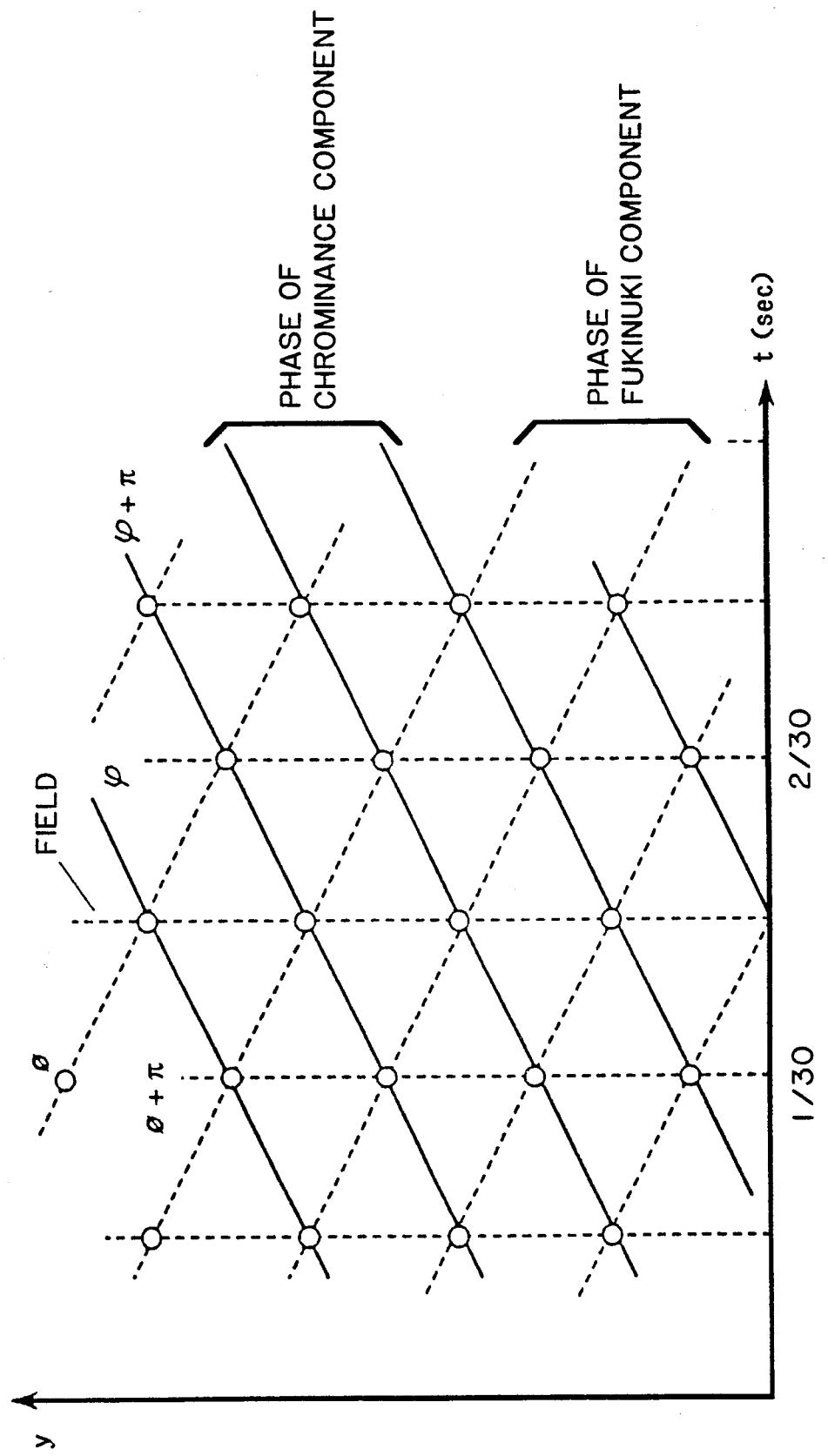
FIG. 2 (prior art) is a graph of vertical line position versus time for several frames of an interlaced television signal which is useful for describing the relationship between the chrominance components and Fukinuki components of a composite video signal.

FIG. 2 is a graph showing the vertical-temporal position of scanning lines and phases for both the chrominance subcarrier signals and the Fukinuki subcarrier signals for an interlaced television signal. As shown in this Figure, the phases of the chrominance signal, $\phi$ and $\phi+\pi$, crawl up with every field while the phases of the Fukinuki signal, $\phi$ and $\phi+\pi$, crawl down with every field. This effect is visible in present-day color television images in which dots at the edges of saturated color objects appear to crawl up the image.

The Fukinuki modulated information is perceptually hidden in the reproduced television image since it appears as flashes of complementary colors occurring at the frame rate (i.e. 30 Hz for NTSC). These flashes are not correlated with the image and, at worst, appear to be random noise. Psychometric studies have shown that the human eye is relatively insensitive to image distortion of this type since the rapidly flashing complementary colors are integrated into their corresponding base color.

Systems which send analog information in a television signal using Fukinuki modulation are well known. An exemplary system of this type is described in U.S. Pat. No. 4,816,899 entitled APPARATUS FOR PROCESSING HIGH-FREQUENCY EDGE INFORMATION IN A WIDE SCREEN TELEVISION SYSTEM, which is hereby incorporated by reference for its teachings on Fukinuki-type modulation.

In this system two analog signals, one representing high-frequency side panel information for a wide aspect ratio television image and the other representing other high-frequency video information, are encoded as respective in-phase and quadrature-phase signals using Fukinuki type modulation. Each of these high-frequency information signals as well as the color information signals and the high-frequency luminance information are made identical for the two fields of each frame. All of these signals plus a low-frequency luminance signal are combined to generate a composite video signal which is compatible with conventional NTSC composite video signals.

The exemplary embodiments of the present invention described below differ from the system described in the above referenced patent in that they format a digital signal for combination with a composite video signal using Fukinuki modulation to produce a television signal which is compatible with the existing NTSC standard.

Figure 3:
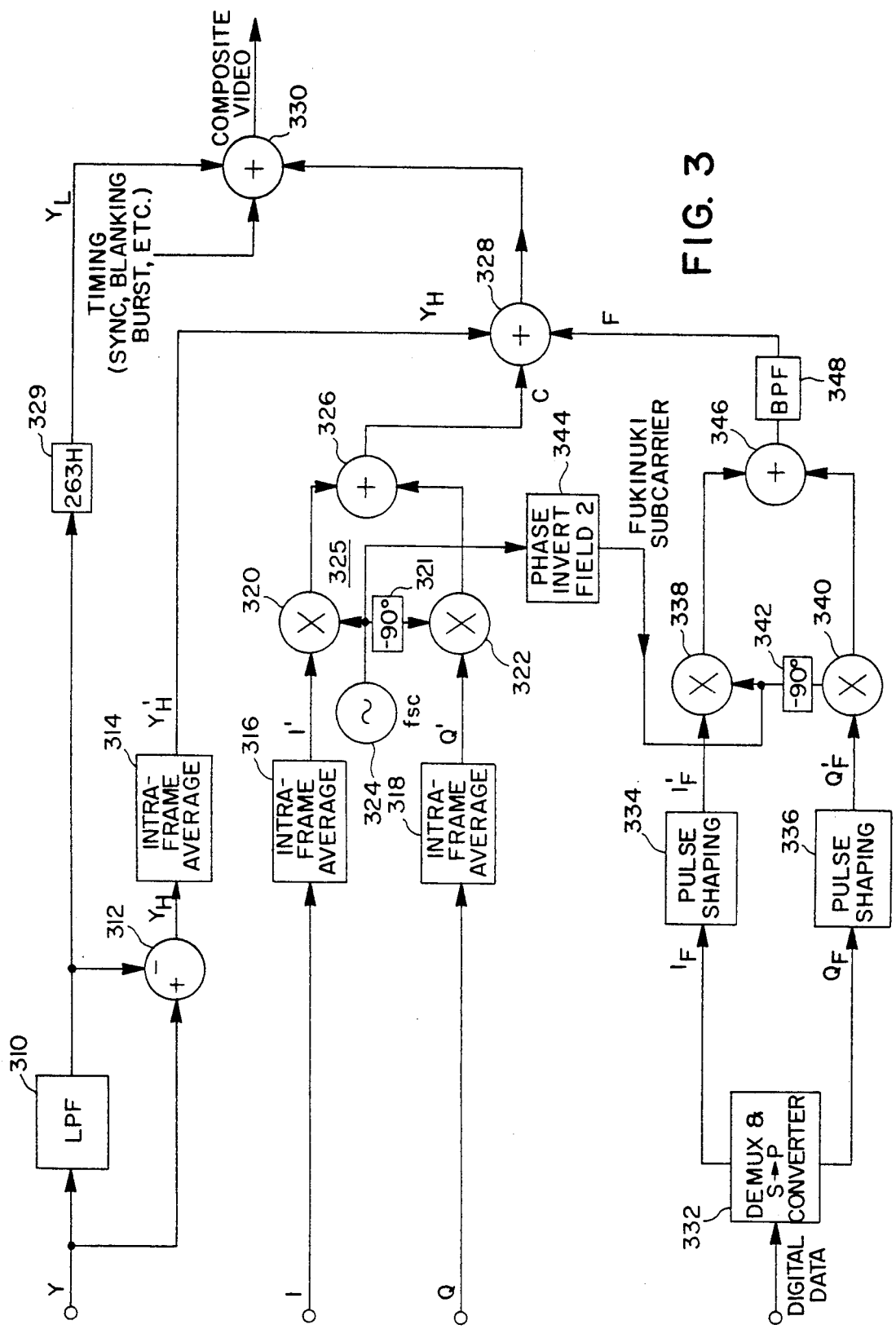
FIG. 3 is a block diagram of a system according to the present invention which is suitable for use in a television transmitter.

An exemplary embodiment of the invention as would be realized in a television studio is shown in FIG. 3. In this Figure, a luminance signal Y is applied to a low-pass filter 310. The exemplary filter 310 passes luminance information having frequencies less than 2.96 MHz to produce the output signal $Y_L$. This signal is subtracted from the input luminance signal Y by the subtracter 312 to produce a high-pass filtered luminance signal $Y_H$. The signal $Y_H$ and the signals I and Q are processed by respective intraframe averaging circuits 314, 316 and 318. Each of these circuits averages corresponding pixel information from both fields of each frame of the video signal to produce pixel values representing the average of the pixels in each of the two fields.

Figure 3A:
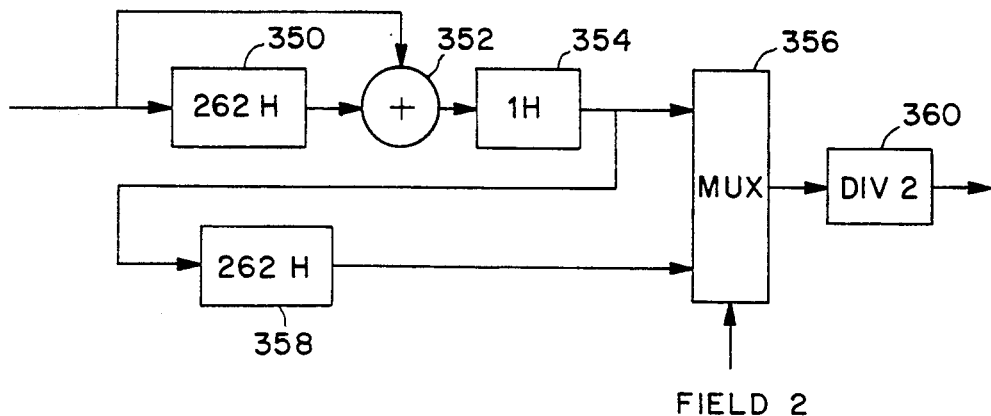
FIG. 3a is a block diagram of an intraframe averaging circuit suitable for use in the system shown in FIG. 3.

An exemplary intraframe averager is shown in FIG. 3a. In this Figure, input samples are applied to a delay element 350 which delays the samples by 262 horizontal line intervals (262 H—i.e. one field interval). The output samples provided by the delay element 350 are summed with the input samples by an adder 352. The samples produced by the adder 352 are then applied to a 1 H delay element 354. The output samples of the 1 H delay element 354 are applied to one signal input port of a multiplexer 356 and to a 262 H delay element 358. The other signal input port of the multiplexer 356 is coupled to receive the output samples provided by the 262 H delay element 358. The multiplexer 356 is responsive to a control signal, FIELD 2, to provide the output signal of the 1 H delay element 354 when field 2 of the input signal is being applied to the intra-frame averaging circuitry and to provide the output signal of the delay element 358 when field 1 is being applied. The output samples produced by the multiplexer 356 are divided by 2 (i.e. shifted to less significant bit positions by 1 bit) by a divider 360. In addition to averaging the 2 fields of each frame of video information, the intraframe averager shown in FIG. 3a delays the video signals by 263 horizontal line intervals (i.e. 263 H).

Referring to FIG. 3, the intraframe averaged I and Q color difference signals provided by the circuits 316 and 318 are next applied to a quadrature modulator 325. The exemplary modulator 325 includes two digital multipliers 320 and 322, a source 324 of color subcarrier signal ($f_{sc}$) and a circuit 321 which shifts the phase of the color subcarrier signal by $-90°$. Multiplier 320 multiplies the in-phase carrier signal $f_{sc}$ by the signal I' provided by the intraframe averaging circuit 316 to produce an amplitude modulated output signal. Similarly, multiplier 322 multiplies the quadrature phase related carrier provided by the phase-shift circuit 321 by the Q' color difference signal, provided by the intraframe averaging circuit 318, to produce an amplitude modulated quadrature carrier signal. The output signals of the multipliers 320 and 322 are combined by an adder 326 to produce the modulated chrominance signal C.

The signal C is combined with the luminance high-frequency signal $Y_H$, provided by the intraframe averaging circuit 314 and with the Fukinuki modulated signal F provided, as described below, by the Fukinuki modulator 345. This combined signal represents the high-frequency components of the composite video signal. It is combined with the low-frequency components of the luminance signal provided by low-pass filter 310 via compensating delay element 329 in an adder 330. As shown in FIG. 3, the timing signals, i.e. the horizontal and vertical synchronization signals, the horizontal and vertical blanking intervals and the color reference burst signal are added to the composite video signal by the adder 330. The signal produced by the adder 330 is a baseband composite video signal.

In a television studio, signals from many different sources are available for transmission. Since it is desirable to combine these signals without abrupt transitions, a common set of timing signals and a common color subcarrier signal are readily available. The signal produced by the adder 330 is synchronized to the other signals to be transmitted using these common signals and the resulting signal is applied to an RF modulator and RF amplifiers to generate a signal for broadcast.

The circuitry described above generates the video signal information which is normally sent in an NTSC broadcast television signal. In addition, in this embodiment of the invention, additional digital information is transmitted with the television signal via Fukinuki-type modulation.

Briefly, this added digital information, in the form of bit-serial digital data, is converted into four-bit nibbles which are then encoded using a 16 QAM modulation scheme. This QAM signal is generated using Fukinuki type modulation rather than conventional quadrature amplitude modulation. The Fukinuki modulated signal is then combined with the high-frequency luminance and chrominance components of the composite video signal as described above to generate a composite video signal for transmission.

In the exemplary embodiment of the invention, bit serial digital data is applied to a demultiplexer and serial to parallel converter 332. To make the data more robust, it may be desirable to encode it using some type of error correcting code (ECC), such as a Huffman code, before it is applied to the demultiplexer and serial to parallel converter 332. Circuitry to perform this function is not shown in the exemplary embodiments of the invention.

Figure 3B:
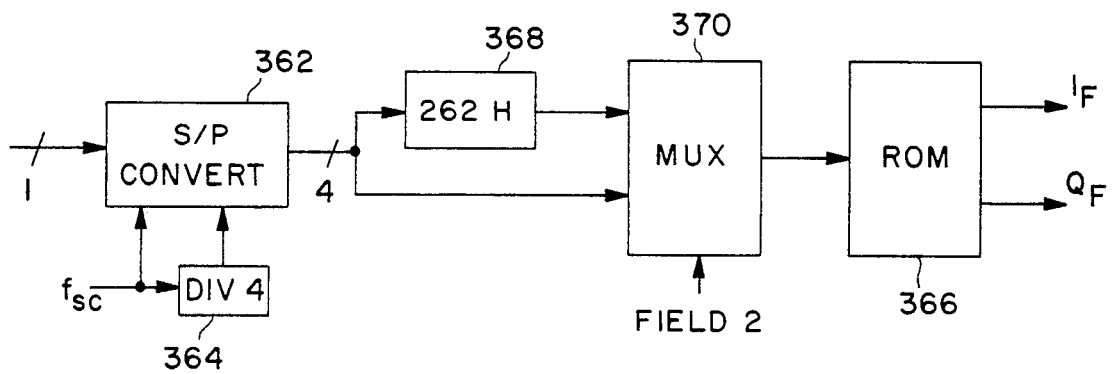
FIG. 3b is a block diagram of a demultiplexer and serial-to-parallel converter suitable for use in the system shown in FIG. 3.

Exemplary circuitry suitable for use as the circuitry 332 is shown in FIG. 3b. In this figure, bit serial digital data is applied to a serial to parallel converter 362 at a data rate of $f_{sc}$. Data is valid only during the second field of each frame. The data is combined into four-bit nibbles, at a symbol rate of $f_{sc}/4$ by the converter 362 using conventional means. The output symbols provided by the converter 362 are applied in parallel to a 262 H delay element 368 and to one data input port of a multiplexer 370. The other input port of the multipler 370 is coupled to receive the output signal provided by the delay element 368.

The multiplexer 370 is controlled by the signal FIELD 2 to provide the data from the serial to parallel converter 362 during the second field of each frame and to provide the data from the 262 H delay element during the next subsequent field (i.e. the first field of the next frame). The output values provided by the multiplexer 370 are applied to the address input port of a read only memory 366. Read only memory 366 converts the four-bit data values into separate data values for the in-phase and quadrature signals $I_F$ and $Q_F$ which are to be used to modulate the Fukinuki carrier.

Figure 4:
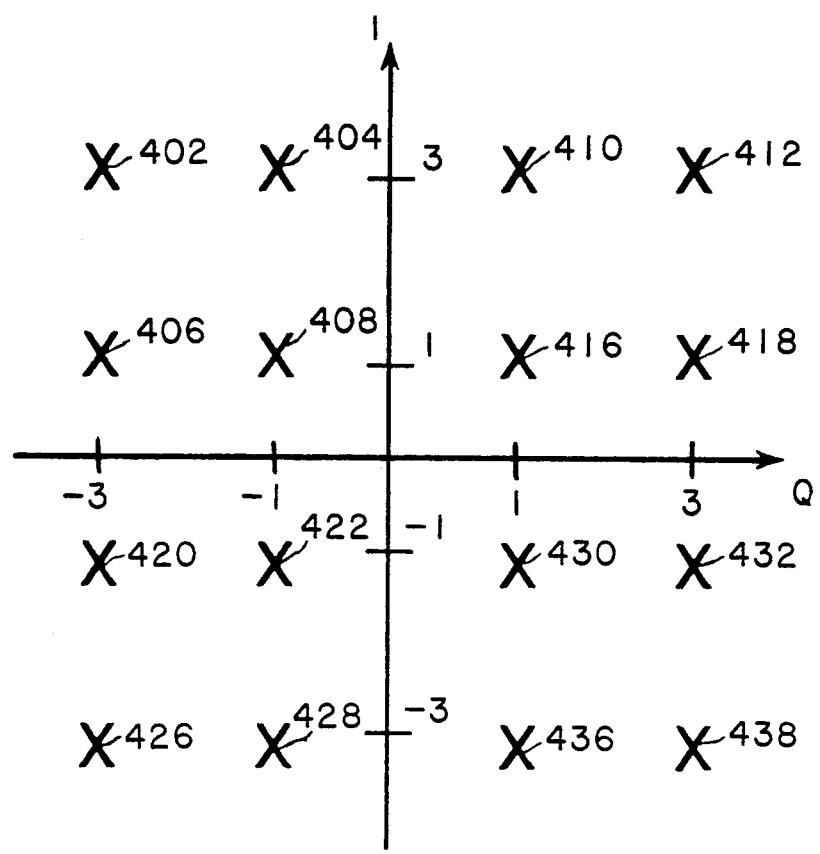
FIG. 4 is a graph of in phase versus quadrature amplitude which is useful for describing a 16 QAM constellation.

The programming of the ROM 366 is illustrated in FIG. 4. This Figure is a graphical depiction of a conventional 16 QAM constellation. Each of the X's in the Figure represents a combination of two signal values, one I and one Q, which are used to encode the 16 digital values that may be represented by the four-bit symbols provided by the serial to parallel converter 362. The points in the constellation may be associated in many ways with the digital values. One exemplary association would be to assign the points in the constellation from the upper left corner to the lower right corner to the successive values zero through 15. Whatever allocation scheme is selected, it is desirably implemented both in the transmitter and the receiver.

Thus, the ROM 366 provides a pair of two-bit values, one representing the I coordinate of the constellation point and the other representing the Q coordinate. As shown in FIG. 4, each of these values may be $-1$, $-3$, $+1$ or $+3$.

Returning to FIG. 3, the two-bit signals $I_F$ and $Q_F$ produced by the demultiplexing and serial to parallel converter circuitry 332 are applied to respective pulse shaping filters 334 and 336. In the exemplary embodiment of the invention, these filters are finite impulse response (FIR) filters having a raised square root cosine frequency response characteristic with a 3 dB point at $f_{sc}/8$.

A combination of these filters and a similar pair of filters in the receiver, described below with reference to FIG. 6, subject the in-phase and quadrature components of the 16 QAM signal to a net raised cosine frequency response characteristic having a 6 dB point at $f_{sc}/8$ and a rolloff parameter of 0.387. This type of frequency response characteristic is especially advantageous for 16 QAM digital modulation systems as described in a section of a textbook by J. G. Proakis entitled *Digital Communications*, McGraw/Hill, 1989, pp. 532-536, which is hereby incorporated by reference. Using this 16 QAM modulation technique, data values at a symbol rate of $f_{sc}/4$ (894.9 KHz) can be encoded with negligible inter-symbol interference.

The filtered signals $I_F'$ and $Q_F'$ provided by the respective pulse shaping filters 334 and 336 are applied to respective multipliers 338 and 340. Multiplier 338 receives the color subcarrier signal, $F_{sc}$, from source 324 via a selective phase inversion circuit 344. The circuit 344 passes the signal $F_{sc}$ during the first field of each frame and passes an inverted (shifted in phase by 180°) version of the signal $F_{sc}$ during the second field of each frame.

The modulating carrier signal applied to the multiplier 340 is the output signal of the selective phase inversion circuit 344 shifted in phase by $-90°$ by the phase shifter circuit 342. Since the subcarrier signals used in this embodiment of the invention are digital signals having a sample rate of $4f_{sc}$, this phase shift operation may be implemented as a three-sample delay element. The multipliers 338 and 340 produce the in-phase and quadrature phase components of a Fukinuki modulated signal. These components are combined by an adder 346 and applied to a bandpass filter 348. The filter 348 limits the range of frequencies occupied by the Fukinuki modulated signal to 620 KHz on either side of the color sub-carrier frequency, $f_{sc}$. As set forth above, the Fukinuki modulated signal is combined with the other high-frequency components of the composite video signal by the adder 328.

Figure 5:
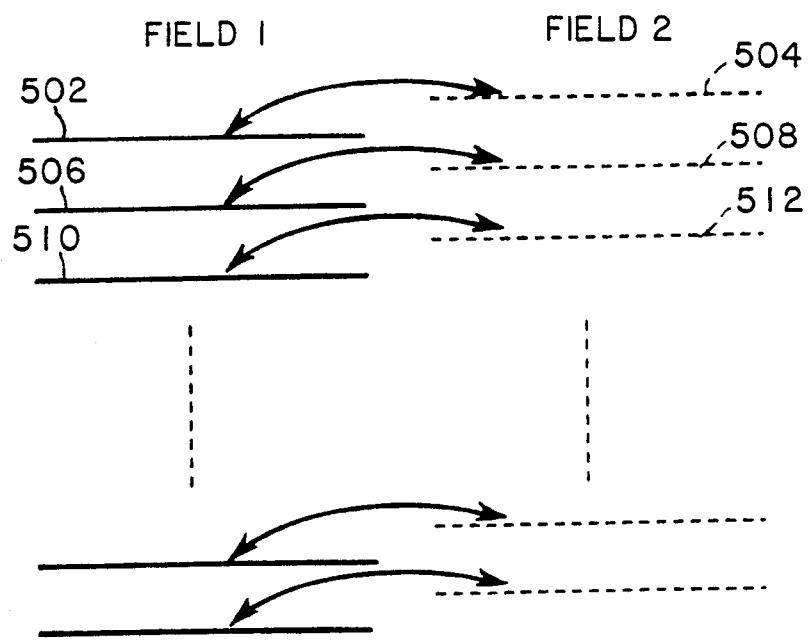
FIG. 5 is a scan-line diagram of a television frame which illustrates the relationship between the information carried by the two fields in a frame.

As described above, all of these high-frequency components are identical between the two fields of each frame. This is illustrated in FIG. 5. This Figure is a scan diagram of a NTSC television signal which illustrates the interlaced nature of the signal. As shown in the Figure, the dashed lines, representing the second field of the frame, occur at spatial positions between the solid lines which represent the first field of the frame. In the exemplary embodiment of the invention, the information content of all of the high-frequency components, i.e. the high-frequency luminance signal, $Y_H$, the chrominance signal component C and the Fukinuki modulated signal F are identical on field one and field two.

The data which is identical between the two fields is illustrated by the arrows in FIG. 5. Thus, the information on line 502 is identical to that on line 504, the information on line 506 is identical to that on line 508, and the information on 510 is identical to that on line 512.

While the information on these lines is identical, the signals are not necessarily identical. For the high-frequency luminance and chrominance information, the signals are identical between the two fields. For the high-frequency Fukinuki modulated information, however, the signals on the two fields are opposite in sign. Thus, when line 502 is added to line 504, the Fukinuki component is eliminated and all that remains are the high-frequency luminance and chrominance information. If line 502 is subtracted from line 504, however, the high-frequency luminance and chrominance information is lost and all that remains is the Fukinuki modulated information.

This is the basic function performed in the receiver to recover both the television image and the accompanying digital data. FIG. 6 is a block diagram of exemplary circuitry suitable for use in a television receiver. In this circuitry, a digital demodulated composite video signal CV is applied to a low-pass filter 602 and to a subtracter 604. The low-pass filter 602 attenuates all components of the composite video signals having frequencies greater than 2.96 MHz. The output signal provided by the low-pass filter 602 is subtracted from signal CV by the subtracter 604 to produce an output signal which represents the high-frequency components of the composite video signal (i.e. those components having frequencies greater than 2.96 MHz). This output signal is applied to a 262 H delay element 606 which delays the signal by one field interval.

The high-pass filtered signal from the subtracter 604 is added to the field delayed signal provided by the delay element 606 in an adder 608. The output signal produced by this adder is a combination of the chrominance signal and high-pass filtered luminance signal; the Fukinuki component has been substantially eliminated by the adder 608. This signal is applied to a 1 H delay element 612, the output signal of which is applied in parallel to one signal input port of the multiplexer 616 and to a 262 H delay element 614. The output signal of delay element 614 is applied to the other input port of the multiplexer 616. Multiplexer 616 is controlled by the signal FIELD 2 to pass the output signal of the 1 H delay element 612 when the second field of each frame is being received and the output signal of the delay element 614 when the first field of the frame is being received.

As described above, the high-frequency luminance and chrominance information is identical for the two fields of each frame. Thus, the output signal produced by the adder 608 is the sum of two copies of the identical information. This is the signal provided by the multiplexer 616. Accordingly, the output terminal of the multiplexer 616 is coupled to a divide-by-two circuit 618. The signal provided by the divide-by-two circuit 618 is the combined high-frequency luminance and chrominance signal components of the input composite video signal.

This signal is applied to a conventional color separation filter/color demodulator 620. This filter which may, for example, include a conventional 1 H comb filter separates the high frequency luminance signal component $Y_H$ and the two color-difference signal components I and Q from the mixed signal applied to its input port using conventional techniques.

The luminance signal $Y_H$ is applied to one input port of an adder 622. The other input port of the adder 622 is coupled to receive the low-frequency luminance signal $Y_L$ provided by the low-pass filter 602. This signal is delayed by 263 H by the delay element 623 to compensate the signal $Y_L$ for processing delays incurred by the signal $Y_H$ through the 262 H delay element 606 and 1 H delay element 612.

The output signal of the adder 622, Y, is the combined high-frequency and low-frequency luminance signals. This signal and the I and Q color-difference signals provided by the filter and demodulator 620 are applied to a dematrixing circuit 624. The circuit 624, which may be of conventional design, combines the signals Y, I and Q to produce three primary color signals, R, G and B, which are used to drive a display device, for example, a cathode ray tube (CRT).

To recover the digital data, the high-pass filtered signal provided by the subtracter 604 and its field-delayed counterpart provided by the 262 H delay element 606 are applied to a subtracter 610. This subtracter generates the difference between the field-delayed signal and the high-pass filtered signal provided by the subtracter 604. As set forth above, when the input signals are the first and second fields of an NTSC video frame, this signal is two times the 16 QAM signal which is used to modulate the Fukinuki carrier. This signal is applied to a 1 H delay element 626 the output port of which is coupled to one signal input port of a multiplexer 630. The other signal input port of the multiplexer 630 is coupled to receive the same signal, delayed one field interval by a 262 H delay element 628.

The multiplexer 630 is conditioned by the control signal FIELD 2 to pass the output signal of the 1 H delay 626 while the second field of a frame is being received and the output signal of the 262 H delay element 628 during the next subsequent field (i.e. the first field of the next frame). Thus, the output signal of the multiplexer 630 is delayed by at least 263 H relative to the signal CV. The output signal provided by the multiplexer is divided in amplitude by two by a divide-by-two circuit 632 to generate a signal, F', which is applied to a 16 QAM demodulator 634. This demodulator, which is described below with reference to FIG. 6a, recovers the four-bit digital data from the 16 QAM signal provided the divide-by-two circuit 632.

As described above, the digital information encoded in the two fields of each frame is identical. Thus, circuit 636 processes the digital data to eliminate the data in the second field of each frame. The output signal of the circuit 636 is a four-bit digital data string.

Since only the digital data from the first field is passed as valid data, it is contemplated that the 262 H delay element and multiplexer 630 may be eliminated without affecting the performance of the digital receiver. In this instance, the data decoded by the 16 QAM demodulator 636 during the second field of each frame is not merely redundant but erroneous.

Figure 6A:
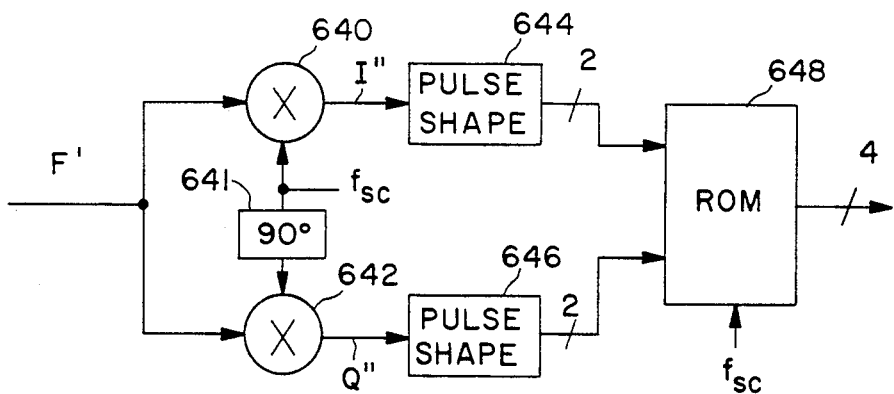
FIG. 6a is a block diagram of a 16 QAM demodulator suitable for use in the circuitry shown in FIG. 6.
Figure 6:
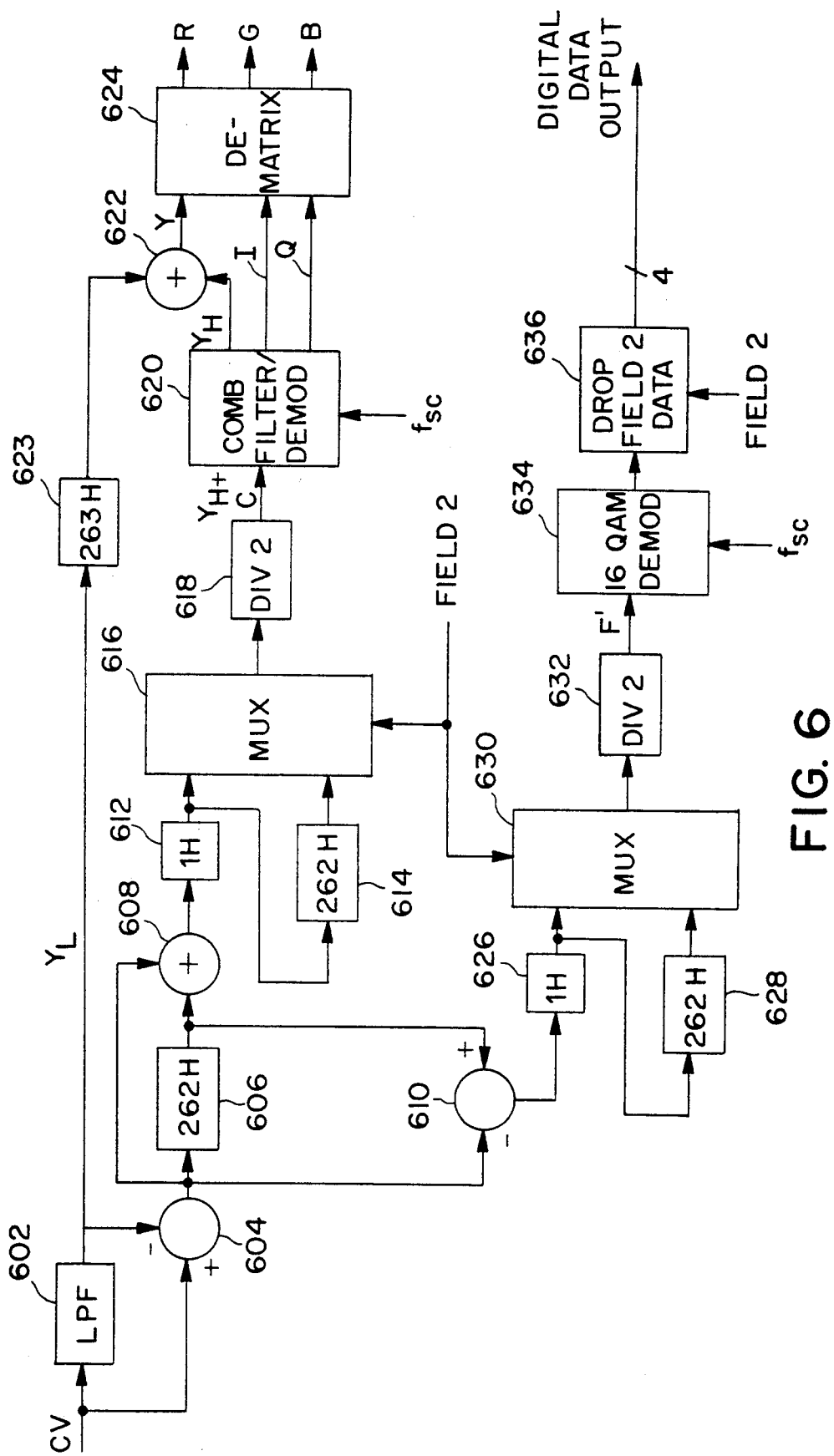
FIG. 6 is a block diagram of circuitry according to the present invention which is useful in a television receiver.

FIG. 6A is a block diagram of an exemplary 16 QAM demodulator suitable for use as the circuit 634, shown in FIG. 6. In this circuit, the signal F' provided by the divide-by-two circuit 632 is applied to two multipliers 640 and 642. The other input port of the multiplier 640 is coupled to receive the color subcarrier signal $f_{sc}$. Multiplier 642 receives a 90° phase-shifted version of this signal from a phase shifter 641. The multipliers 640 and 642 demodulate the quadrature-modulated information to provide the signals $I_f''$ and $Q_f''$ which are substantially the same as the signals $I_f'$ and $Q_f'$ of FIG. 3. These signals are applied to respective pulse-shaping filters 644 and 646.

As described above, the filters 644 and 646 apply raised square root cosine frequency response characteristics to the respective signals $I_f''$ and $Q_f''$. The two-bit output signals provided by the filters 644 and 646 are applied to the address input port of a ROM 648. The ROM 648 is responsive to a clock signal having a frequency $f_{sc}$ to load the combined address value at an appropriate time and to reproduce the encoded digital data. While the pulse-shaping filters 644 and 646 may be identical to the filters 334 and 336 of FIG. 3, the ROM 648 is programmed as the inverse of the ROM 366 shown in FIG. 3B. Thus, the ROM 648 produces four-bit output signals in response to input values representing points in the 16 QAM constellation shown in FIG. 4.

While this invention has been described in terms of a purely digital implementation, it is contemplated that portions of the invention may be implemented using analog circuitry. In particular, the entire conventional NTSC television processing system may be implemented using analog circuitry and the portion of the Fukinuki modulator following ROM 366 may be implemented in analog circuitry by inserting respective digital-to-analog converters (not shown) on the two output ports of the ROM 366.

Similarly, the circuitry in the receiver may be entirely analog up to the 16 QAM demodulator 634. In this instance, an analog to digital converter would be inserted between the divide-by-two circuit 632 and the QAM demodulator 634.

Furthermore, while the invention has been described in terms of an NTSC interlaced video signal, it is contemplated that it may be practiced using any other interlaced video signal format such as PAL or SECAM. And, while a 16 QAM digital encoding technique has been described, it is contemplated that other digital modulation techniques, such as PSK, may be used as long as they generate separate in-phase and quadrature signals which are combined with the video signal using Fukinuki-type modulation.

Finally, depending on the transmission medium, it may be desirable to preprocess the composite video signal that is applied to the receiver circuitry shown in FIG. 6 to eliminate multipath distortion. This may be done by using a ghost cancellation filter (not shown) such as that disclosed in U.S. Pat. No. 4,864,403 entitled, ADAPTIVE TELEVISION GHOST CANCELLATION SYSTEM INCLUDING FILTER CIRCUITRY WITH NON-INTEGER SAMPLE DELAY which is hereby incorporated by reference for its teachings on automatic ghost cancellation.

While the invention has been described in terms of an exemplary embodiment, it is contemplated that it may be practiced as outlined above within the spirit and scope of the appended claims.

The Invention claimed is:

1. Apparatus for transmitting a digital data signal including a plurality of successive values as a component part of an analog video signal in which a frame of video information is represented as first and second interlaced fields, said apparatus comprising:
   means, responsive to the analog video signal for generating a modified video signal containing substantially identical information in a predetermined band of frequencies in each of the first and second interlaced fields of the frame;
   means for encoding each successive value of the digital data signal into separate and distinct in-phase and quadrature phase signal values, wherein each of the respective in-phase and quadrature phase signals contains information which is substantially identical in both the first and second fields of the frame;
   means for modulating in-phase and quadrature phase Fukinuki subcarrier signals with the in-phase and quadrature phase signals, respectively;
   means for combining the modulated in-phase and quadrature phase Fukinuki subcarrier signals with the modified analog video signal to generate an analog output video signal; and
   means responsive to the analog output video signal for recovering the digital values.

2. Apparatus according to claim 1, wherein each digital data value encoded into the in-phase and quadrature phase data signals is a symbol and, the apparatus further includes pulse shaping filtering means for filtering each of in-phase and quadrature phase data signals to substantially eliminate inter-symbol interference.

3. Apparatus according to claim 2, wherein the pulse shaping filtering means exhibits a square-root raised cosine frequency response characteristic.

4. Apparatus according to claim 3 wherein:
   the predetermined band of frequencies includes a chrominance signal in which first and second color difference signals modulate respective first and second quadrature phase related color subcarrier signals; and
   the Fukinuki subcarrier signals have substantially the same frequency as the first and second quadrature phase related color subcarrier signals but differ in phase with respect to the first and second quadrature phase related color subcarrier signals by 180° during only one of the first and second fields of the frame.

5. Apparatus according to claim 4, wherein the means for encoding the digital data into in-phase and quadrature phase data signals includes means for generating a 16 quadrature amplitude modulated (16 QAM) signal.

6. Apparatus for transmitting a sequence of digital data values in an analog video signal in which a frame of video information is represented by said video signal as first and second interlaced fields, said apparatus comprising:
   filtering means for separating a high-frequency component of said analog video signal which occupies a predetermined band of frequencies from lower frequency components of said video signal which have frequencies outside of the predetermined band of frequencies;

means, responsive to the high-frequency component signal representing the first and second fields of the frame of the video signal, for generating a modified high-frequency component signal which is substantially identical for both of the first and second fields;

means for encoding each successive digital data value into separate and distinct in-phase and quadrature phase signal values, wherein each of the respective in-phase and quadrature phase signals contains information which is substantially identical for corresponding data values in both the first and second fields of the frame;

a source of respective in-phase and quadrature-phase carrier signals each of which changes in phase by 180° substantially coincident with the video signal changing between the first and second fields;

means for modulating the in-phase carrier signal with the in-phase signal to generate a modulated in-phase carrier signal and for modulating the quadrature-phase carrier signal with the quadrature phase signal to generate a modulated quadrature-phase carrier signal, wherein each of the modulated in-phase and quadrature-phase signals occupies said predetermined band of frequencies;

means for combining the modulated in-phase carrier signal, the modulated quadrature phase carrier signal with the modified high-frequency component signal for each of the first and second fields to generate a combined high-frequency signal;

means for combining the lower frequency video signal components with the combined high-frequency signal to generate the analog video signal containing the encoded digital signal; and means, responsive to the analog video signal for recovering the encoded digital signal and for recovering the digital data values from the encoded digital signal.

7. Apparatus according to claim 6, further including:
means for formatting the digital signal into symbols before it is encoded by the means for encoding; and
pulse shaping filtering means for filtering each of in-phase and quadrature phase signals to substantially eliminate inter-symbol interference.

8. Apparatus according to claim 7, wherein the pulse shaping filtering means exhibits a square-root raised cosine frequency response characteristic.

9. Apparatus according to claim 6, wherein the means for encoding the digital signal into in-phase and quadrature phase signals includes means for generating a 16 quadrature amplitude modulated (16 QAM) signal.

10. Apparatus for processing an analog video signal to recover a digital data signal, including a sequence of digital values, which digital data signal has been encoded in the analog video signal, wherein the analog video signal represents video information in successive frames, each of the frames including first and second interlaced fields, said apparatus comprising:

filtering means for separating the analog video signal into a first component, occupying a predetermined band of frequencies, which includes analog signals representing the encoded digital data and a second component which is substantially exclusive of the encoded digital data;

delay means for delaying the first component of the video signal by an amount of time corresponding to one of said interlaced fields to provide a field-delayed first component video signal;

means for subtracting the first component of the video signal provided by the filtering means from the field-delayed first component video signal to produce a difference signal;

means for multiplying the difference signal by first and second quadrature-phase related carrier signals to produce respective in-phase and quadrature phase signals; and decoding means for processing both the in-phase and quadrature phase signals, according to a predetermined decoding algorithm, to recover the encoded sequence of digital data values.

11. Apparatus for processing a video signal to recover digital data which has been encoded in the video signal, wherein the video signal represents video information in successive frames, each of the frames including first and second interlaced fields and wherein the digital data is encoded in the video signal using a 16 quadrature amplitude modulation (16 QAM) technique, the apparatus comprising:

filtering means for separating the video signal into a first component, occupying a predetermined band of frequencies, which includes the encoded digital data and a second component which is substantially exclusive of the encoded digital data;

delay means for delaying the first component of the video signal by an amount of time corresponding to one of said interlaced fields to provide a field-delayed first component video signal;

means for subtracting the first component of the video signal provided by the filtering means from the field-delayed first component video signal to produce a difference signal;

means for multiplying the difference signal by first and second quadrature-phase related carrier signals to produce respective in-phase and quadrature phase signals; and decoding means for processing the in-phase and quadrature phase signals, according to a predetermined decoding algorithm, to recover the encoded digital data, wherein the decoding means comprises:

means for filtering each of said in-phase and quadrature-phase signals according to a square-root raised cosine frequency response characteristic to produce shaped output pulses;

means for sampling each of said shaped output pulses at predetermined instants to generate successive address values; and read-only memory means, coupled to the means for sampling, for providing, as said decoded digital values, digital values stored in said read-only memory means at memory locations corresponding to said successive address values.

12. A method of transmitting a sequence of digital data values as a component part of an analog video signal in which video information is represented in successive frames, each of the frames including first and second interlaced fields, said method comprising the steps of:

modifying said analog video signal to contain substantially identical information in the first and second fields of each frame in a predetermined band of frequencies;

encoding each digital data value into separate and distinct in-phase and quadrature phase signal values, wherein each of the respective in-phase and quadrature phase signals contains information which is substantially identical in both the first and second fields of the frame;

modulating respective in-phase and quadrature phase Fukinuki carrier signals with the in-phase and quadrature phase signals;

combining the modulated in-phase and quadrature phase Fukinuki carrier signals with the modified video signal to generate an encoded analog video signal; and processing the encoded analog video signal to recover the sequence of digital data values.

* * * * *